(12) United States Patent
Yorita et al.

(10) Patent No.: US 9,939,081 B2
(45) Date of Patent: Apr. 10, 2018

(54) VALVE APPARATUS

(71) Applicant: DENSO CORPORATION, Kariya, Aichi-Pref (JP)

(72) Inventors: Hiroshi Yorita, Nishio (JP); Takanobu Kawano, Nishio (JP); Masashi Nakagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 15 days.

(21) Appl. No.: 15/268,771

(22) Filed: Sep. 19, 2016

(65) Prior Publication Data

US 2017/0114920 A1 Apr. 27, 2017

(30) Foreign Application Priority Data

Oct. 22, 2015 (JP) ................................. 2015-207946

(51) Int. Cl.
*F16K 31/06* (2006.01)
*F16H 61/00* (2006.01)
*G05D 16/00* (2006.01)
*F16H 61/02* (2006.01)
*G05D 16/20* (2006.01)

(52) U.S. Cl.
CPC ......... *F16K 31/0675* (2013.01); *F16H 61/00* (2013.01); *F16H 61/0251* (2013.01); *F16K 31/0668* (2013.01); *G05D 16/00* (2013.01); *G05D 16/2013* (2013.01)

(58) Field of Classification Search
CPC .. F16K 31/0675; F16K 31/0668; F16H 61/00; G05D 16/00

USPC .................................................... 137/625.69
See application file for complete search history.

(56) References Cited

U.S. PATENT DOCUMENTS

| 5,222,417 A * | 6/1993 | Sato | F16H 61/0021 137/330 |
|---|---|---|---|
| 6,155,654 A * | 12/2000 | Oyama | B60T 8/36 137/14 |
| 6,431,131 B1 * | 8/2002 | Hosoya | F01L 1/022 123/90.15 |
| 2006/0011878 A1 * | 1/2006 | Denyer | F16K 31/0613 251/129.08 |

(Continued)

FOREIGN PATENT DOCUMENTS

JP H10-198431 7/1998

*Primary Examiner* — Kevin Murphy
*Assistant Examiner* — Kelsey Cary
(74) *Attorney, Agent, or Firm* — Nixon & Vanderhye P.C.

(57) ABSTRACT

A control circuit includes a computing unit, which computes a target oil pressure, a duty output unit, which outputs a drive electric current based on a result of computation of the computing unit, and a dither output unit, which applies a dither signal to a linear solenoid. The dither signal is added to the drive electric current outputted from the duty output unit and is applied to the linear solenoid. The dither output unit always applies the dither signal to the linear solenoid throughout an operation. The dither output unit reduces a pulse height of the dither signal in a dead zone in comparison to a pulse height of the dither signal in a control zone. In this way, even when an axial position of a spool is changed between the control zone and the dead zone, the amplitude of dither of the spool can be made generally constant. Thereby, it is possible to limit a change in an output oil pressure.

3 Claims, 5 Drawing Sheets

(56) References Cited

U.S. PATENT DOCUMENTS

2009/0277516 A1\* 11/2009 Winkler ............... G05D 7/0635
  137/486
2010/0101653 A1\* 4/2010 Ogata .................... F16H 61/12
  137/2

\* cited by examiner

FIG. 8

VALVE APPARATUS

CROSS REFERENCE TO RELATED APPLICATION

This application is based on and incorporates herein by reference Japanese Patent Application No. 2015-207946 filed on Oct. 22, 2015.

TECHNICAL FIELD

The present disclosure relates to a valve apparatus that drives a spool valve through a linear solenoid.

BACKGROUND

There is known a valve apparatus that drives a spool valve through a linear solenoid (see, for example, JPH10-198431A).

JPH10-198431A discloses a technique of generating dither, which has a sufficiently small amplitude, in a spool of an electromagnetic spool valve device in the valve apparatus to place the spool into a state of dynamic friction, so that hysteresis is reduced.

The electromagnetic spool valve device has a zone, which is located around each of a movement start location of a plunger of the linear solenoid and a movement end location of the plunger. In this zone, even when the spool is moved in an axial direction, an output oil pressure of the electromagnetic spool valve device does not change.

In the following discussion, the movable range of the spool relative to a sleeve is assumed to have a control zone and two dead zones. The control zone is defined as a zone, in which the output oil pressure changes in response to movement of the spool in the axial direction. The dead zone is defined as a zone, in which the output oil pressure does not change even though the spool is moved.

(First Disadvantage)

Even in the dead zone, clamping of a foreign object between the sleeve and the spool can be limited through application of appropriate dither to the spool.

Therefore, it is desirable to apply the dither to the spool even in the dead zone.

Hereinafter, a signal, which is supplied to the linear solenoid to generate the dither in the spool, is defined as a dither signal.

A pulse height and a frequency of the dither signal are set such that the dither signal causes generation of the dither, which places the spool into the state of the dynamic friction, and a change in the output oil pressure, which is caused by the dither, is sufficiently reduced. Specifically, the pulse height and the frequency of the dither signal are set for the purpose of alleviating the hysteresis, and thereby the pulse height and the frequency of the dither signal are set to be appropriate in the control zone.

Figure 3A:
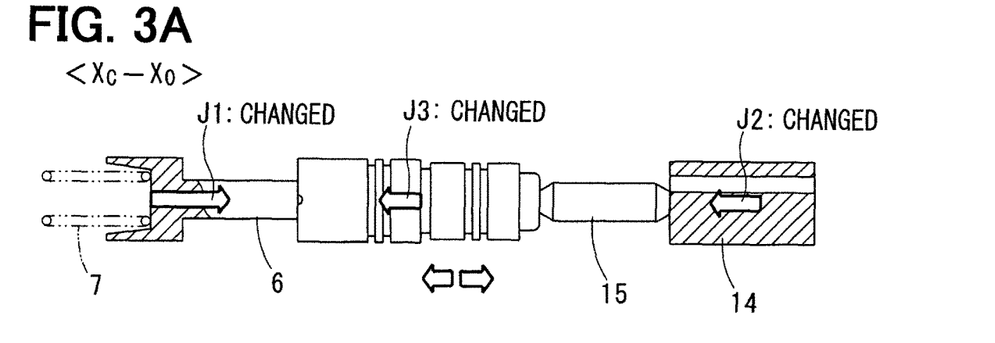
FIG. 3A is a descriptive diagram for describing forces applied to the spool in a control zone according to the first embodiment.

In the control zone, at the time of driving the spool, a spring force of a spring, a drive force of the linear solenoid, and a feedback (F/B) force exerted in a F/B chamber by a feedback oil pressure are changed (see FIG. 3A).

Figure 3B:
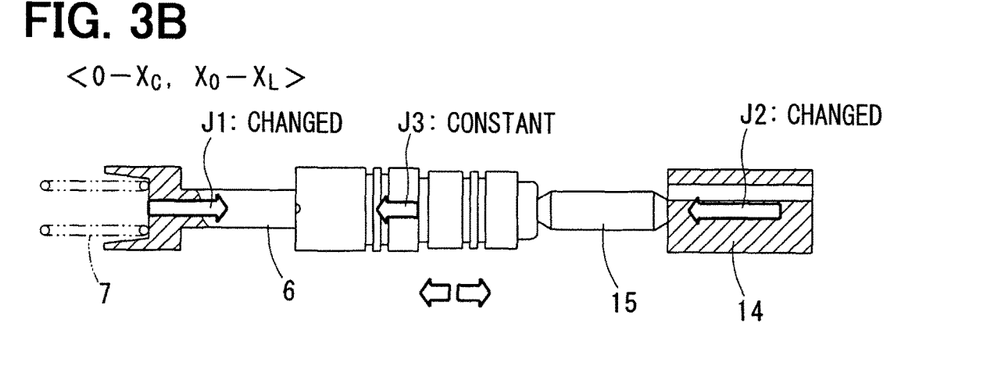
FIG. 3B is a descriptive diagram for describing forces applied to the spool in a dead zone according to the first embodiment.

In contrast, in the dead zone, the F/B force does not change (see FIG. 3B).

The inventors of the present application have found that a spring constant of a spring system (including the spring and the F/B chamber), which applies a spring force against oscillation of the spool, differs between the control zone and the dead zone. Specifically, the spring constant of the spring system in the dead zone is smaller than the spring constant of the spring system in the control zone.

Therefore, at the time of changing the axial position of the spool from the control zone to the dead zone, since the spring constant is reduced in the dead zone, the amplitude of the dither of the spool is disadvantageously increased in the dead zone. Thereby, in a case where the dither is applied to the spool in the dead zone, at the time of changing a position of the spool from the control zone to the dead zone, the amplitude of the dither is increased to cause a large change in the output oil pressure.

(Second Disadvantage)

The inventors of the present application have found that due to the difference in the spring constant of the spring system, which applies the spring force to the spool, between the control zone and the dead zone, an eigenfrequency of the spool, the plunger and a push rod also differs between the control zone and the dead zone. Specifically, the eigenfrequency in the dead zone is reduced in comparison to the eigenfrequency in the control zone (see FIG. 6).

In order to ease the control of the amplitude of the dither, the frequency, which generates the dither, is normally set to a frequency that is slightly smaller than the eigenfrequency. Specifically, the frequency, which generates the dither, is set to be a frequency that is slightly smaller than the eigenfrequency in the control zone (see a dotted line C and reference sign $F_2$ in FIG. 6).

However, since the eigenfrequency is reduced in the dead zone, the amplitude of the dither in the dead zone is reduced due to the influence of the eigenfrequency. Therefore, the amplitude of the dither, which can limit the clamping of the foreign object in the dead zone, cannot be applied to the spool in the dead zone.

SUMMARY

The present disclosure addresses the above disadvantage. According to a first aspect of the present disclosure, there is provided a valve apparatus that includes a spool valve, a spring, a linear solenoid and a dither output unit. The spool valve includes a sleeve and a spool. The sleeve is shaped into a tubular form. The spool is supported in an inside of the sleeve such that the spool is slidable in an axial direction. The spool valve generates an output oil pressure, which corresponds to a position of the spool in the axial direction. The spring is installed in the spool valve and urges the spool toward one side in the axial direction. The linear solenoid drives the spool against an urging force of the spring. The dither output unit applies a dither signal, which causes generation of dither in the spool, to the linear solenoid. The spool valve includes a feedback chamber that applies an axial force, which corresponds to an increase in the output oil pressure, to the spool. A movable range of the spool relative to the sleeve in the axial direction includes a control zone, in which the output oil pressure changes in response to movement of the spool in the axial direction, and a dead zone, in which the output oil pressure does not change even when the spool is moved in the axial direction. The dither output unit applies the dither signal to the linear solenoid in both of the control zone and the dead zone. The dither output unit reduces a pulse height of the dither signal in the dead zone in comparison to a pulse height of the dither signal in the control zone.

According to a second aspect of the present disclosure, instead of reducing the pulse height of the dither signal in the dead zone in comparison to the pulse height of the dither signal in the control zone, the dither output unit may reduce a frequency of the dither signal in the dead zone in comparison to a frequency of the dither signal in the control zone.

BRIEF DESCRIPTION OF THE DRAWINGS

The drawings described herein are for illustration purposes only and are not intended to limit the scope of the present disclosure in any way.

DETAILED DESCRIPTION

Various embodiments of the present disclosure will be described with reference to the accompanying drawings. The following embodiments show examples of the present disclosure, and the present disclosure should not be limited to these embodiments.

First Embodiment

A first embodiment will be described with reference to FIGS. 1 to 5B.

In the present embodiment, a valve apparatus of the present disclosure is applied to an oil pressure control system of an automatic transmission.

The valve apparatus of the oil pressure control system includes an electromagnetic spool valve device 1 and a control circuit 2. The electromagnetic spool valve device 1 is installed to a valve housing that forms an oil pressure circuit. The control circuit 2 controls energization of the electromagnetic spool valve device 1.

The electromagnetic spool valve device 1 includes a spool valve 3 and a linear solenoid 4, which are joined together in an axial direction. In the present embodiment, as one specific example of the electromagnetic spool valve device 1, there will be described an electromagnetic spool valve device of a normally open type, in which an output oil pressure is maximized at the time of stopping an electric power supply to the electromagnetic spool valve device.

First of all, a specific structure of the electromagnetic spool valve device 1 will be described.

The spool valve 3 includes a sleeve 5, a spool 6 and a spring 7. The sleeve 5 is shaped into a generally cylindrical tubular form. The spool 6 is supported in an inside of the sleeve 5 such that the spool 6 is slidable in an axial direction. The spring 7 urges the spool 6 toward one side (a right side in FIG. 1) in the axial direction.

Figure 1:
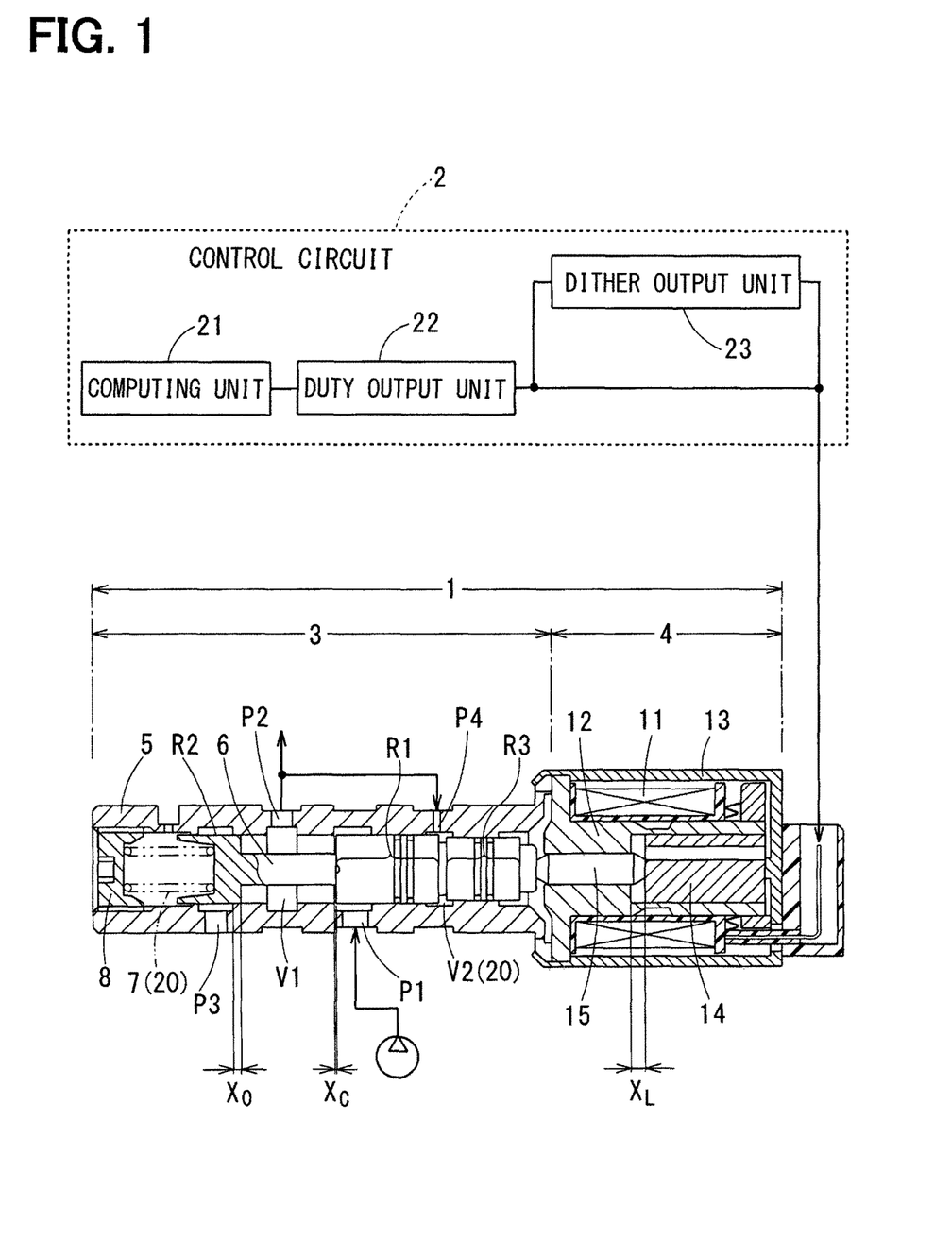
FIG. 1 is a diagram indicating a block diagram of a control circuit and a cross section of an electromagnetic spool valve device according to a first embodiment of the present disclosure.

In the following description, a moving direction (i.e., the axial direction) of the spool 6 is a left-to-right direction. The left-to-right direction is used for the descriptive purpose in view of the drawings and should not limit an actual installation orientation of the electromagnetic spool valve device 1. In the following description, the linear solenoid 4 side of the spool valve 3 will be described as the right side, and the opposite side of the spool valve 3, which is opposite from the linear solenoid 4, will be described as the left side. Furthermore, in the following description, "feedback" will be abbreviated as "F/B."

The sleeve 5 has an input port P1, an output port P2, a drain port P3 and an F/B port P4. The input port P1 receives a pump oil pressure. The output port P2 is communicated with, for example, a friction engagement device of the automatic transmission through an oil passage. The drain port P3 returns the oil to, for example, an oil pan. The F/B port P4 is communicated with the output port P2.

Each of these ports P1-P4 is a through hole that extends through a wall of the sleeve 5 in a radial direction to communicate between an inside and an outside of the sleeve 5. Annular grooves, each of which is communicated with a corresponding one of the ports P1-P4, are formed in an inner peripheral surface of the sleeve 5. The drain port P3, the output port P2, the input port P1 and the F/B port P4 are arranged one after another in this order from the left side to the right side of the sleeve 5.

The spool 6 has an input land R1, a drain land R2 and a F/B land R3. The input land R1 adjusts an opening degree of the input port P1. The drain land R2 adjusts an opening degree of the drain port P3. The F/B land R3 has an outer diameter that is smaller than an outer diameter of the input land R1.

The drain land R2, the input land R1 and the F/B land R3 are arranged one after another in this order from the left side to the right side of the spool 6.

A distribution chamber V1, which is communicated with the output port P2, is formed between the input land R1 and the drain land R2.

Furthermore, a F/B chamber V2, which is communicated with the F/B port P4, is formed between the input land R1 and the F/B land R3.

A positional relationship between the input port P1 and the input land R1, and a positional relationship between the drain port P3 and the drain land R2 are set to implement the function of the normally open type.

Specifically, in a non-energized state of the linear solenoid 4, in which the electric power supply to the linear solenoid 4 is stopped, the input land R1 opens the input port P1, and the drain land R2 closes the drain port P3, so that the output port P2 is communicated only with the input port P1.

Furthermore, in a state where the electric power is supplied to the linear solenoid 4, and thereby the spool 6 is moved toward the left side for a small amount, the input land R1 opens the input port P1, and the drain land R2 opens the drain port P3, so that an output oil pressure, which corresponds to a position of the spool 6, is generated in the output port P2.

Furthermore, in a state where the spool 6 is moved toward the left side for a large amount, the input land R1 closes the input port P1, and the drain land R2 opens the drain port P3, so that the output port P2 is communicated only with the drain port P3.

Figure 2A:
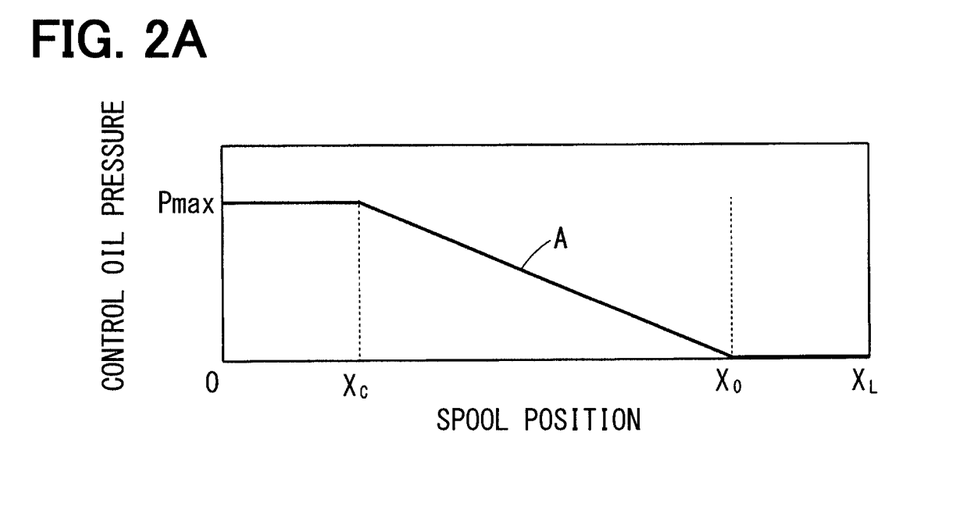
FIG. 2A is a graph indicating a relationship between a movable range (position) of a spool and an output oil pressure of the electromagnetic spool valve device according to the first embodiment.

A solid line A of FIG. 2A indicates a change in the output oil pressure (control oil pressure) in response to the movement of the spool 6.

As is understood from FIG. 2A, the output oil pressure is held at the maximum constant pressure from a position 0 of the spool 6, at which the electric power supply to the linear solenoid 4 is stopped, to a position $X_C$ of the spool 6, at which the input land R1 closes the input port P1. That is, a zone, which is from the position 0 to the position $X_C$, is a dead zone.

Furthermore, the output oil pressure changes in response to the movement of the spool 6 when the position (axial position) of the spool 6 in the axial direction is in a zone that is from the position $X_C$ to a position $X_0$, at which the drain land R2 closes the drain port P3. That is, the zone, which is from the position $X_C$ to the position $X_0$, is a control zone.

Furthermore, the output oil pressure becomes generally 0 (zero) when the axial position of the spool 6 is in a zone, which is from the position $X_0$ to a maximum lift position $X_L$ of the spool 6. That is, the zone, which is from the position $X_0$ to the position $X_L$, is a dead zone.

When the oil pressure exerted in the output port P2 is increased, the F/B oil pressure, which is exerted in the F/B chamber V2, is increased. Therefore, an axial force, which is directed toward the left side against the urging force of the spring 7, is exerted to the spool 6 by a pressure difference that is proportional to the land difference between the input land R1 and the F/B land R3. In this way, displacement of the spool 6 is stabilized, and thereby a change in the oil pressure exerted in the output port P2 can be limited.

The spring 7 is a compression coil spring that is spirally wound and urges the spool 6 toward the right side.

An adjust screw 8 is screwed into a left end portion of the sleeve 5. The spring 7 is held in a compressed state in a space between the adjust screw 8 and the spool 6.

The linear solenoid 4 is joined to a right end portion of the sleeve 5 and drives the spool 6 to displace the spool 6 toward the left side according to the amount of electric power supply. The linear solenoid 4 has a known structure and includes a coil 11, a stator 12, a yoke 13 and a plunger 14. The coil 11 generates a magnetic force that corresponds to the amount of electric power supply. The stator 12 and the yoke 13 form a magnetic flux loop. The plunger 14 is driven toward the left side by the magnetic force generated by the coil 11.

A push rod 15, which is shaped into a rod form, is supported in a center portion of the stator 12 such that the push rod 15 is slidable in the axial direction. Therefore, when the amount of electric power supply to the coil 11 is increased to drive the plunger 14 toward the left side, the spool 6 is driven toward the left side by the plunger 14 through the push rod 15. Here, it should be noted that the structure of the linear solenoid 4 shown in FIG. 1 is the one example, and the structure of the linear solenoid 4 should not be limited to the one shown in FIG. 1.

The energization of the linear solenoid 4 is controlled by the control circuit 2.

The control circuit 2 controls the amount of electric power supply to the linear solenoid 4 through a known duty ratio control operation. That is, the control circuit 2 controls the amount of electric power supply to the linear solenoid 4 to control the output oil pressure of the output port P2.

With reference to FIGS. 3A and 3B, the axial force, which is exerted from the spring 7 against the spool 6, is denoted as a spring force J1. Also, the axial force, which is exerted from the linear solenoid 4 against the spool 6, is denoted as a drive force J2. Furthermore, the axial force, which is exerted against the spool 6 by the F/B oil pressure generated in the F/B chamber V2, is denoted as a F/B force J3.

In such a case the spool 6 is balanced by "Spring Force J1=Drive Force J2+F/B Force J3."

Characteristic Technique of First Embodiment

The control circuit 2 includes a computing unit 21 and a duty output unit 22. The computing unit 21 computes a target oil pressure. The duty output unit 22 outputs a drive electric current at a duty ratio, which corresponds to the target oil pressure computed by the computing unit 21.

Figure 4A:
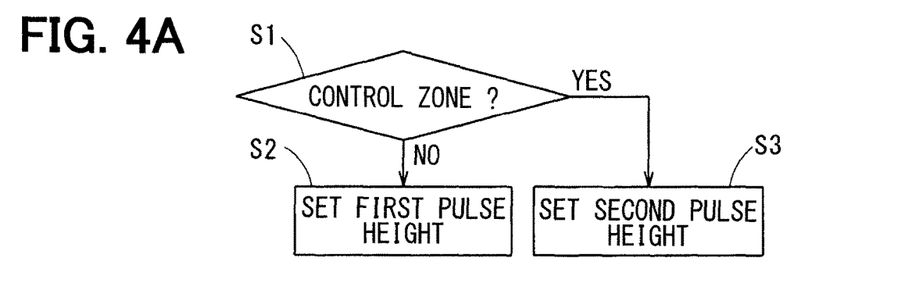
FIG. 4A is a flowchart showing an exemplary control operation for changing a pulse height according to the first embodiment.
Figure 4B:
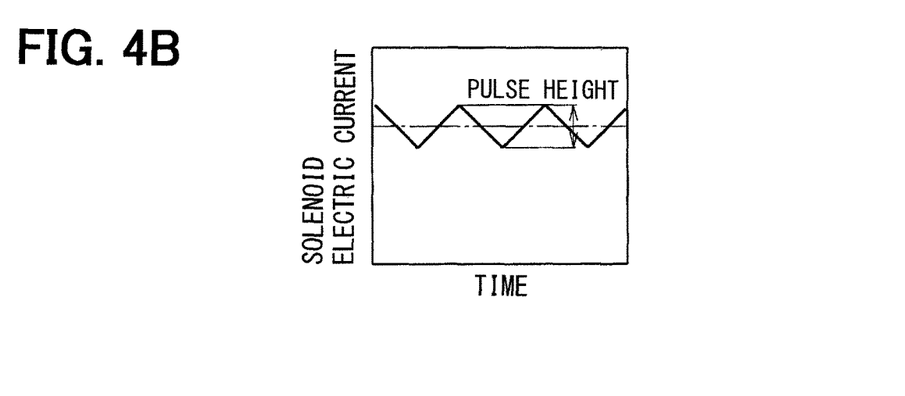
FIG. 4B is a descriptive diagram for describing the dither signal according to the first embodiment.

The control circuit 2 also includes a dither output unit 23 that outputs a dither signal, which causes generation of dither in the spool 6, to the linear solenoid 4. As shown in FIG. 4B, the dither signal, which is outputted from the dither output unit 23, is a pulse signal of about a few kHz that oscillates the drive electric current. The dither signal is added to the drive electric current outputted from the duty output unit 22 and is applied to the linear solenoid 4.

The dither output unit 23 always applies the dither signal to the linear solenoid 4 throughout the operation of the linear solenoid 4 (both of the control zone and the dead zones). Specifically, the dither output unit 23 applies the dither signal to the linear solenoid 4 in both of the control zone and the dead zones.

Due to the diameter difference between the input land R1 and the F/B land R3 discussed above, the oil in the F/B chamber V2 exerts a spring force (damping force) against oscillation of the spool 6 in the axial direction. Thus, the spring 7 and the F/B chamber V2 cooperate with each other to form a spring system 20 that applies the spring force against the oscillation of the spool 6. A spring constant of the spring system 20 in the control zone is different from a spring constant of the spring system 20 in the dead zone.

The difference between the spring constant of the spring system 20 in the control zone and the spring constant of the spring system 20 in the dead zone will be briefly described with reference to FIGS. 3A and 3B.

At the time of moving the spool 6 in the control zone, as shown in FIG. 3A, the spring force J1, the drive force J2 and the F/B force J3 are changed.

In contrast, at the time of moving the spool 6 in the dead zone, as shown in FIG. 3B, the spring force J1 and the drive force J2 are changed, and the F/B force J3 is not changed, i.e., is constant.

Therefore, the spring constant of the spring system 20 in the dead zone is reduced in comparison to the spring constant of the spring system 20 in the control zone. More specifically, in the control zone, the spring force of the spring 7 and the spring force of the oil pressure in the F/B chamber V2 are applied against the oscillation of the spool 6 in the axial direction. In contrast, in the dead zone, only the spring force of the spring 7 is applied to the oscillation of the spool 6 in the axial direction. Therefore, the spring constant of the spring system 20 (i.e., a spring constant of the spring 7 alone) for damping the oscillation of the spool 6 in the dead zone is smaller than the spring constant of the spring system 20 (i.e., a combined spring constant of the spring 7 and the oil in the F/B chamber V2) for damping the oscillation of the spool 6 in the control zone.

Figure 2B:
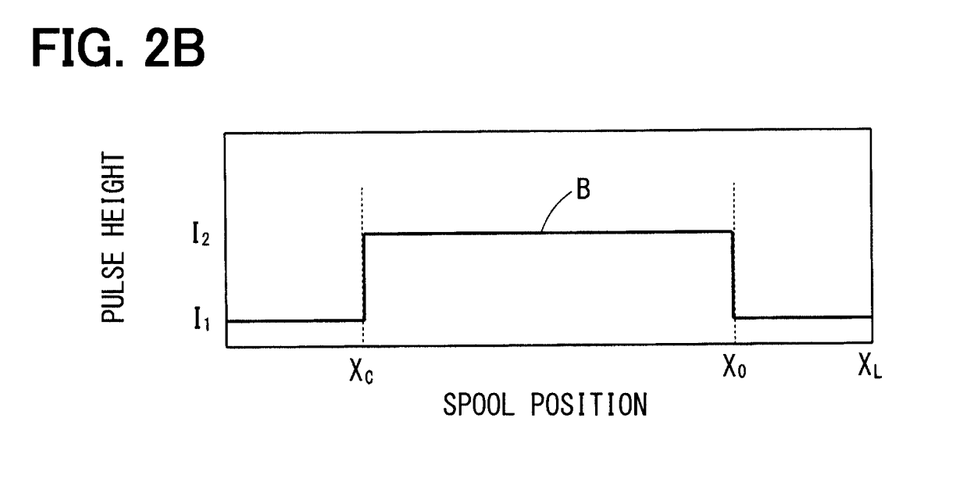
FIG. 2B is a graph indicating a relationship between the movable range (position) of the spool and a pulse height of a dither signal according to the first embodiment.

In view of the above point, the dither output unit 23 of the first embodiment is constructed such that a pulse height of the dither signal in the dead zone is reduced from a pulse height of the dither signal in the control zone, as indicated by a solid line B in FIG. 2B.

Specifically, in a case where the pulse height of the dither signal in the control zone is denoted as a second pulse height $I_2$, the dither signal is set at the second pulse height $I_2$ in the control zone, which is from the position $X_C$ to the position $X_0$ of the spool 6.

In contrast, in a case where the pulse height of the dither signal in the dead zone is denoted as a first pulse height $I_1$, the dither signal is set at the first pulse height $I_1$ in the dead zone, which is from the position 0 to the position $X_C$ of the spool 6, and the dead zone, which is from the position $X_C$ to the position $X_L$ of the spool 6.

The dither output unit 23 has a changing function (switching function) for changing the dither signal to the second pulse height $I_2$ or the first pulse height $I_1$ through determination of whether the axial position of the spool 6 is in the control zone or the dead zone.

A specific example of the changing function will now be described. At the time of executing the changing function, the dither output unit 23 receives a duty ratio signal from the duty output unit 22 and determines whether the axial position of the spool 6 is in the control zone or the dead zone based on the duty ratio. When it is determined that the axial position of the spool 6 is in the control zone, the dither output unit 23 changes the dither signal to the second pulse height $I_2$. In contrast, when it is determined that the axial position of the spool 6 is in the dead zone, the dither output unit 23 changes the dither signal to the first pulse height $I_1$. It should be noted that the above operation is the one example, and the changing function may be executed based on the computation result of the computing unit 21 to determine whether the spool 6 is in the control zone or the dead zone.

The control operation for changing the pulse height will be described with reference to FIG. 4A.

First of all, at step S1, it is determined whether the axial position of the spool 6 is in the control zone, which is from the position $X_C$ to the position $X_0$. When it is determined that the axial position of the spool 6 is not in the control zone, which is from the position $X_C$ to the position $X_0$, at step S1 (i.e., NO at step S1), the operation proceeds to step S2. In contrast, when it is determined that the axial position of the spool 6 is in the control zone, which is from the position $X_C$ to the position $X_0$, at step S1 (i.e., YES at step S1), the operation proceeds to step S3.

At step S2, since it is determined that the axial position of the spool 6 is in the dead zone (i.e., the axial position of the spool 6 is not in the control zone) at step S1, the pulse height of the dither signal is set to the first pulse height $I_1$.

At step S3, since it is determined that the axial position of the spool 6 is in the control zone at step S1, the pulse height of the dither signal is set to the second pulse height $I_2$.

Figure 5A:
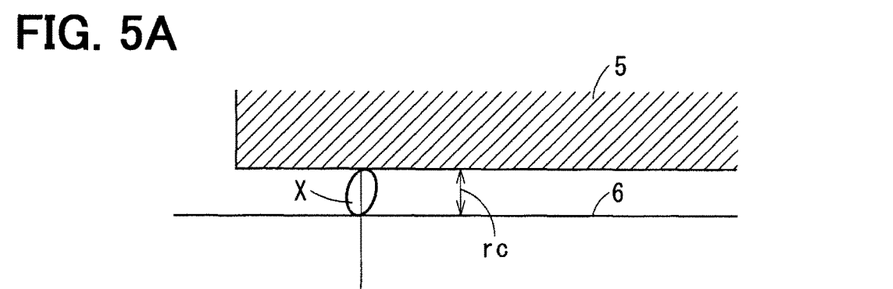
FIG. 5A is a descriptive diagram showing a state where a foreign object is clamped between a sleeve and the spool according to the first embodiment.
Figure 5B:
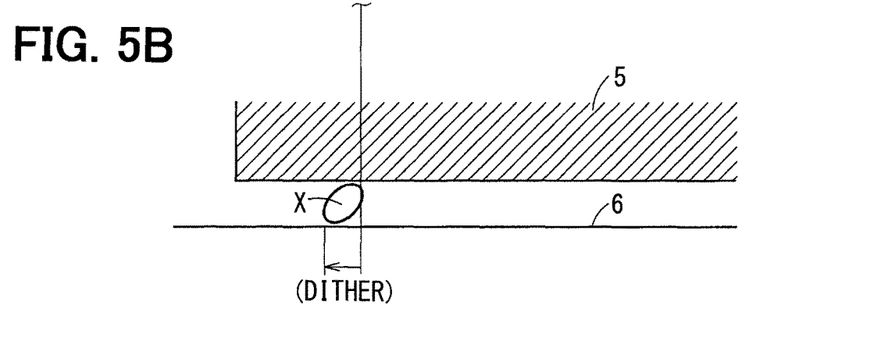
FIG. 5B is a descriptive diagram showing a state where the foreign object is released between the sleeve and the spool through application of the dither according to the first embodiment.

With reference to FIGS. 5A and 5B, the first pulse height is set to a value that can limit clamping of a foreign object X between the sleeve 5 and the spool 6 through application of the dither to the spool 6. An amplitude of the dither may be the same as a clearance rc between the sleeve 5 and the spool 6 (see FIG. 5A).

Specifically, as shown in FIG. 5A, in a case where the foreign object X is temporarily clamped between the sleeve 5 and the spool 6, the foreign object X contacts both of the sleeve 5 and the spool 6 in many cases. At this time, as shown in FIG. 5B, when the sleeve 5 is moved by a distance, which is generally the same as the clearance re, the foreign object X is rolled and is thereby released between the sleeve 5 and the spool 6 to ease flowing of the foreign object X.

In contrast, the second pulse height $I_2$ is set to a value that alleviates the hysteresis by placing the spool 6 in the state where the dynamic friction is generated at the spool 6 through the application of the dither to the spool 6.

Furthermore, the first pulse height $I_1$ and the second pulse height $I_2$ are set such that even when the changing function for changing between the first pulse height in the dead zone and the second pulse height $I_2$ in the control zone is executed, a change in the amplitude of the dither is minimized.

A specific example of the first pulse height $I_1$ and a specific example of the second pulse height $I_2$ will now be described.

The first pulse height $I_1$ is obtained through the following equation.

$$I_1 \approx K_{sp} \cdot rc/C_S$$

The second pulse height $I_2$ is obtained through the following equation.

$$I_2 \approx [K_{sp} + \{P_{max}/(X_0 - X_C)\} \cdot (S_{in} - S_{fb})] \cdot rc/C_S$$

In the above equations, $K_{sp}$ denotes a spring constant of the spring 7.

Furthermore, $S_{in} - S_{fb}$ is a pressure receiving surface area for receiving the F/B oil pressure.

$C_S$ is a value that is obtained by subtracting an electric current proportionality constant $I_S$ of the linear solenoid 4 from a pushing force $F_S$ of the linear solenoid 4. That is, $C_S = F_S - I_S$.

Furthermore, $P_{max}$ is a maximum output oil pressure at the output port P2.

Advantages of First Embodiment

The oil pressure control device applies the dither signal to the solenoid 4 in both of the control zone and the dead zone and reduces the pulse height of the dither signal in the dead zone in comparison to the pulse height of the dither signal in the control zone.

Although the spring constant of the spring system 20 (i.e., the spring constant of the spring 7 alone) for damping the oscillation of the spool 6 in the dead zone is smaller than the spring constant of the spring system 20 (i.e., the combined spring constant of the spring 7 and the oil in the F/B chamber V2) for damping the oscillation of the spool 6 in the control zone, the amplitude of the dither in the control range can be made generally equal to the amplitude of the dither in the dead zone by reducing the pulse height of the dither signal in the dead zone in comparison to the pulse height of the dither signal in the control zone. Therefore, even when the position of the spool 6 is changed between the control zone and the dead zone, the amplitude of the dither of the spool 6 can be kept generally constant.

Thereby, in the control range, the hysteresis can be limited by the dither applied to the spool 6. Furthermore, in the dead zone, the clamping of the foreign object X can be limited by the dither applied to the spool 6. Furthermore, at the time of changing the position of the spool 6 between the control zone and the dead zone, the change in the amplitude of the dither can be limited, and thereby it is possible to avoid a large change in the output oil pressure caused by the change in the amplitude of the dither.

Second Embodiment

Figure 7:
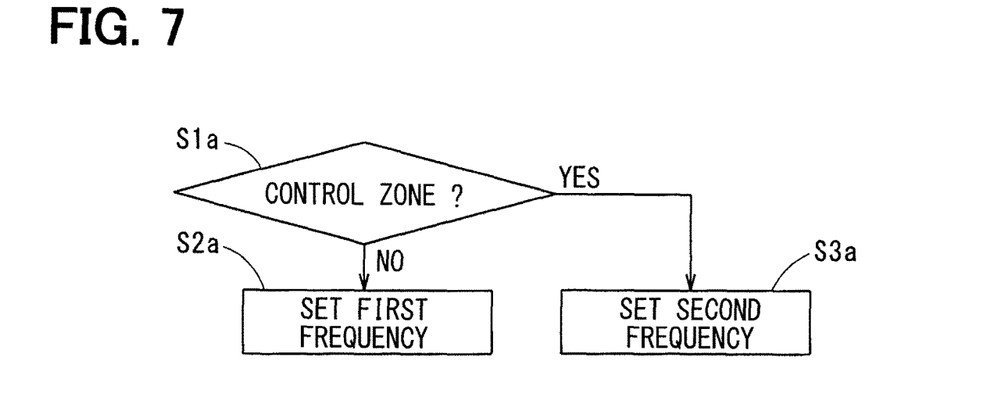
FIG. 7 is a flowchart showing an exemplary control operation for changing a frequency of the dither signal according to the second embodiment.
Figure 8:
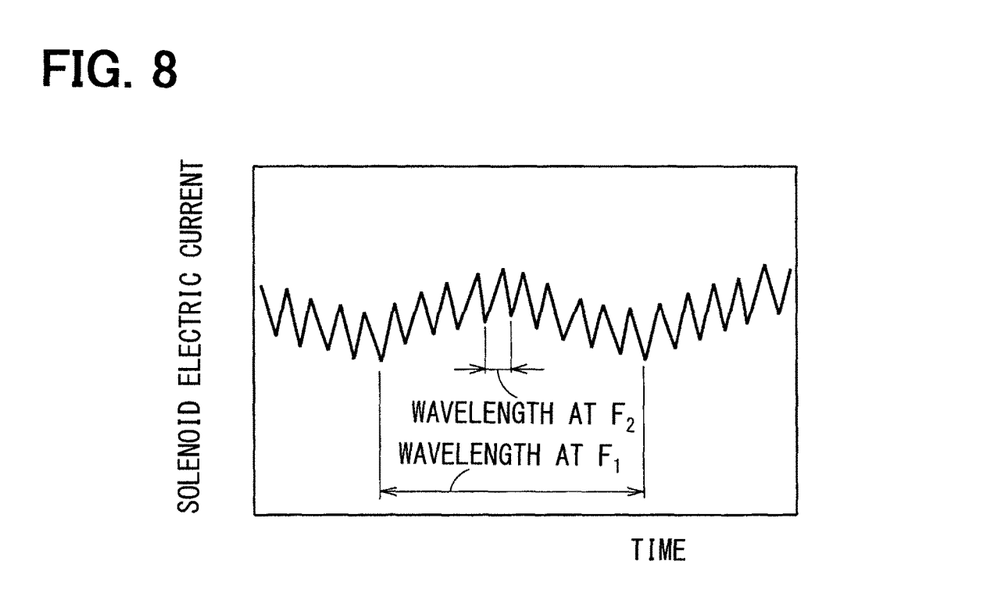
FIG. 8 is a descriptive diagram for describing the dither signal according to the second embodiment.

Now, a second embodiment of the present disclosure will be described with reference to FIGS. 6 to 8. In the following discussion, the portions, which are the same as those in the first embodiment with respect to the function thereof, will be indicated by the same reference numerals. Furthermore, in the following discussion, only the differences, which are different from the first embodiment, will be described, and the portions, which are not discussed in the second embodiment, are the same as those of the first embodiment.

As discussed above, the spring constant of the spring system 20 (i.e., the combined spring constant of the spring 7 and the oil in the F/B chamber V2) in the control zone differs from the spring constant of the spring system 20 (i.e., the spring constant of the spring 7 alone) in the dead zone. Therefore, the eigenfrequency of the spool 6, the plunger 14 and the push rod 15 differs between the control zone and the dead zone. Specifically, the eigenfrequency in the dead zone is reduced in comparison to the eigenfrequency in the control zone. In such a case, the clamping of the foreign object may not be limited in the dead zone.

This point will now be described with reference to FIG. 6.

Figure 6:
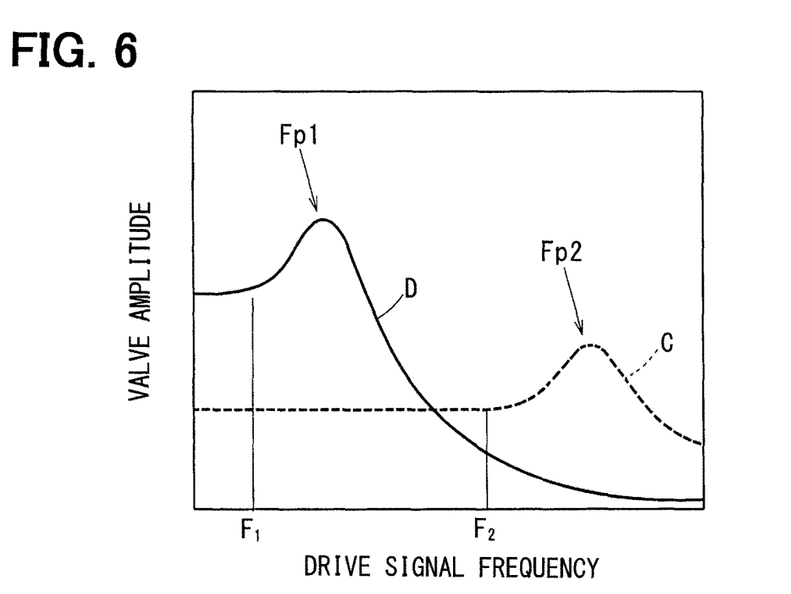
FIG. 6 is a graph showing a relationship between a frequency of the dither signal and an amplitude of the dither (valve amplitude) according to a second embodiment of the present disclosure.

The dotted line C in FIG. 6 indicates the change in the amplitude of the spool 6 (i.e., the valve) at the time of changing the frequency of the dither signal in the control zone. The eigenfrequency in the control zone will be defined as a second eigenfrequency Fp2.

The amplitude of the spool 6 is disturbed at or around the second eigenfrequency Fp2. Therefore, in the control zone, the frequency for generating the dither is set to a frequency that is slightly lower than the second eigenfrequency Fp2. This frequency is defined as a second frequency $F_2$.

A solid line D in FIG. 6 indicates a change in the amplitude of the spool 6 at the time of changing the frequency of the dither signal in the dead zone. The eigenfrequency in the dead zone will be defined as a first eigenfrequency Fp1.

As shown in FIG. 6, the second frequency $F_2$ is higher than the first eigenfrequency Fp1. Therefore, even when the second frequency $F_2$ is applied to the linear solenoid 4 in the dead zone, the amplitude of the spool 6 becomes small. Thereby, the clamping of the foreign object cannot be limited.

The dither output unit 23 of the second embodiment is configured such that the frequency of the dither signal in the dead zone is reduced in comparison to the frequency of the dither signal in the control zone. Specifically, in a case where the frequency of the dither signal in the dead zone is defined as a first frequency $F_1$, the frequency of the dither signal is set to the first frequency $F_1$ in the dead zone, and the frequency of the dither signal is set to the second frequency $F_2$ in the control zone.

An example of the control operation for changing the frequency will be described with reference to the flowchart of FIG. 7.

At step S1a, it is determined whether the axial position of the spool 6 is in the control zone, which is from the position $X_C$ to the position $X_0$. When it is determined that the axial position of the spool 6 is not in the control zone, which is from the position $X_C$ to the position $X_0$, at step S1a (i.e., NO at step S1a), the operation proceeds to step S2a. In contrast, when it is determined that the axial position of the spool 6 is in the control zone, which is from the position $X_C$ to the position $X_0$, at step S1a (i.e., YES at step S1a), the operation proceeds to step S3a.

Since it is determined that the axial position of the spool 6 is in the dead zone (i.e., the axial position of the spool 6 is not in the control zone) at step S1a (i.e., NO at step S1a), the frequency of the dither signal is set to the first frequency $F_1$ at step S2a.

Since it is determined that the axial position of the spool 6 is in the control zone at step S1a (i.e., YES at step S1a), the frequency of the dither signal is set to the second frequency $F_2$ at step S3a.

An example of the first frequency $F_1$ and an example of the second frequency $F_2$ will now be described.

The first frequency $F_1$ is set to a value that is about 20% lower than the first eigenfrequency Fp1. Specifically, the first frequency $F_1$ is set according to the following equation 1.

$$F_1 < \frac{1}{2\pi}\sqrt{\frac{k_{sp}}{m}} \quad \text{[Equation 1]}$$

The second frequency $F_2$ is set to a value that is about 20% lower than the second eigenfrequency Fp2. Specifically, the second frequency $F_2$ is set according to the following equation 2.

$$\frac{1}{2\pi}\sqrt{\frac{k_{sp}}{m}} \leq F_2 < \frac{1}{2\pi}\sqrt{\frac{k_{sp} + \dfrac{P_{max}}{X_0 - X_C} \cdot (S_{in} - S_{fb})}{m}} \quad \text{[Equation 2]}$$

In the above equations, m denotes a total mass of the spool 6, the plunger 14 and the push rod 15.

Advantages of Second Embodiment

As discussed above, the oil pressure control device applies the dither signal to the linear solenoid 4 in both of the control zone and the dead zone and reduces the frequency of the dither signal in the dead zone in comparison to the frequency of the dither signal in the control zone.

Although the eigenfrequency in the dead zone is reduced in comparison to the eigenfrequency in the control zone, the frequency of the dither signal in the dead zone is reduced in comparison to the frequency of the dither signal in the control zone. In this way, it is possible that the amplitude of the dither in the control zone is generally equal to the amplitude of the dither in the dead zone. Therefore, even when the axial position of the spool 6 is changed between the control zone and the dead zone, the amplitude of the dither can be kept generally constant.

Thereby, the advantages, which are similar to those of the first embodiment, can be achieved.

Other Characteristic Techniques in Second Embodiment

The dither output unit 23 of the second embodiment includes a frequency divider (a frequency dividing means)

for dividing the frequency of the dither signal, which is set in the control zone. When the frequency divider divides the frequency of the dither signal, which is set in the control zone, the frequency of the dither signal in the dead zone is reduced. In other words, the dither output unit 23 reduces the frequency of the dither signal, which is set in the dead zone, through the division of the frequency of the dither signal, which is set in the control zone. Specifically, as shown in FIG. 8, in the dead zone, the pulse signal, which is used in the control zone, is frequency divided to generate the first frequency $F_1$.

With this configuration, it is possible to have a single oscillator that generates the dither signal. As a result, the present disclosure can be implemented while the increase in the costs is limited.

Other Embodiments

In the above embodiments, the electromagnetic spool valve device 1 of the normally open type is used. Alternatively, an electromagnetic spool valve device of a normally closed type, in which the output oil pressure is minimized at the time of stopping the supply of the electric power, may be used in place of the electromagnetic spool valve device 1 of the normally open type. In such a case, the locations of the input port P1, the output port P2, the drain port P3 and the F/B port P4 in the spool valve 3 are reversed in the left-to-right direction in comparison to the above embodiments, and the rest of the structure is the same as that of the above embodiments.

In the above embodiments, the present disclosure is applied to the valve apparatus, which adjusts the output oil pressure with the electromagnetic spool valve device 1. Alternatively, the present disclosure may be applied to a valve apparatus, which adjusts the amount of output oil with the electromagnetic spool valve device 1.

Furthermore, the first embodiment may be combined with the second embodiment.

What is claimed is:
1. A valve apparatus comprising:
a spool valve that includes:
a sleeve, which is shaped into a tubular form; and
a spool, which is supported in an inside of the sleeve such that the spool is slidable in an axial direction, wherein the spool valve generates an output oil pressure, which corresponds to a position of the spool in the axial direction;
a spring that is installed in the spool valve and urges the spool toward one side in the axial direction;
a linear solenoid that drives the spool against an urging force of the spring; and
a dither output unit that applies a dither signal, which causes generation of dither in the spool, to the linear solenoid, wherein:
the spool valve includes a feedback chamber that applies an axial force, which corresponds to an increase in the output oil pressure, to the spool;
a movable range of the spool relative to the sleeve in the axial direction includes:
a control zone, in which the output oil pressure changes in response to movement of the spool in the axial direction; and
a dead zone, in which the output oil pressure does not change even when the spool is moved in the axial direction;
the dither output unit applies the dither signal to the linear solenoid in both of the control zone and the dead zone; and
the dither output unit reduces a pulse height of the dither signal in the dead zone in comparison to a pulse height of the dither signal in the control zone.

2. A valve apparatus comprising:
a spool valve that includes:
a sleeve, which is shaped into a tubular form; and
a spool, which is supported in an inside of the sleeve such that the spool is slidable in an axial direction, wherein the spool valve generates an output oil pressure, which corresponds to a position of the spool in the axial direction;
a spring that is installed in the spool valve and urges the spool toward one side in the axial direction;
a linear solenoid that drives the spool against an urging force of the spring; and
a dither output unit that applies a dither signal, which causes generation of dither in the spool, to the linear solenoid, wherein:
the spool valve includes a feedback chamber that applies an axial force, which corresponds to an increase in the output oil pressure, to the spool;
a movable range of the spool relative to the sleeve in the axial direction includes:
a control zone, in which the output oil pressure changes in response to movement of the spool in the axial direction; and
a dead zone, in which the output oil pressure does not change even when the spool is moved in the axial direction;
the dither output unit applies the dither signal to the linear solenoid in both of the control zone and the dead zone; and
the dither output unit reduces a frequency of the dither signal in the dead zone in comparison to a frequency of the dither signal in the control zone.

3. The valve apparatus according to claim 2, wherein the dither output unit reduces the frequency of the dither signal, which is set in the dead zone, through division of the frequency of the dither signal, which is set in the control zone.

* * * * *